(12) United States Patent
Yamasaki

(10) Patent No.: US 9,296,331 B2
(45) Date of Patent: Mar. 29, 2016

(54) VEHICLE HEADLIGHT

(71) Applicant: Fuji Jukogyo Kabushiki Kaisha, Tokyo (JP)

(72) Inventor: Kentarou Yamasaki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/314,172

(22) Filed: Jun. 25, 2014

(65) Prior Publication Data

US 2015/0003097 A1  Jan. 1, 2015

(30) Foreign Application Priority Data

Jun. 26, 2013 (JP) ................. 2013-133683

(51) Int. Cl.
*F21S 8/10* (2006.01)
*B60Q 1/068* (2006.01)
*B60Q 1/076* (2006.01)

(52) U.S. Cl.
CPC .............. *B60Q 1/0683* (2013.01); *B60Q 1/076* (2013.01); *F21S 48/1159* (2013.01); *F21S 48/1258* (2013.01); *F21S 48/1323* (2013.01); *F21S 48/328* (2013.01)

(58) Field of Classification Search
CPC ..... B60Q 1/0683; B60Q 1/076; F21S 48/328; F21S 48/1323; F21S 48/1159; F21S 48/1258
USPC ....................................................... 362/516
See application file for complete search history.

(56) References Cited

U.S. PATENT DOCUMENTS

| 8,113,699 | B2 | 2/2012 | Tsutsumi |
| 2001/0019483 | A1 | 9/2001 | Takada |
| 2009/0237938 | A1 | 9/2009 | Tsutsumi |
| 2011/0249460 | A1 * | 10/2011 | Kushimoto ................... 362/510 |

FOREIGN PATENT DOCUMENTS

| JP | 2001-195910 | 7/2001 |
| JP | 2009-230959 | 10/2009 |
| JP | 2010-182587 | 8/2010 |
| JP | 2011-003515 | 1/2011 |
| JP | 2011-161035 | 8/2011 |

OTHER PUBLICATIONS

Japanese Office Action dated Dec. 2, 2014, which issued during prosecution of Japanese Application No. 2013-133683, which corresponds to the present application.

* cited by examiner

*Primary Examiner* — Joseph L Williams
(74) *Attorney, Agent, or Firm* — Troutman Sanders LLP

(57) ABSTRACT

A vehicle headlight includes: a first illuminator that including a projector unit having a projection optical system and illuminates a predetermined region ahead of a vehicle with a first light distribution pattern having a cutoff line at an upper end; and a second illuminator that includes a reflector unit having a reflective optical system and illuminates, with a second light distribution pattern that partially overlaps with the first light distribution pattern, a region extended further toward an upper side than the first light distribution pattern in a range outside a predetermined horizontal angle from an elbow point of the cutoff line.

1 Claim, 5 Drawing Sheets

VEHICLE HEADLIGHT

CROSS-REFERENCE TO RELATED APPLICATIONS

The present application claims priority from Japanese Patent Application No. 2013-133683 filed on Jun. 26, 2013, the entire contents of which are hereby incorporated by reference.

BACKGROUND

1. Technical Field

The present invention relates to a headlight provided to a vehicle such as an automobile, and particularly relates to a headlight with which early detection of a pedestrian or the like ahead of the vehicle is possible even with a passing beam having a cutoff line.

2. Related Art

A headlight of a vehicle such as an automobile projects light emitted from a light source such as, for instance, an incandescent light bulb, discharge lamp, and LED with a projection optical system such as a projector and a reflective optical system such as a reflector.

With such a headlight, switching is possible between a driving beam (high beam) for use during normal driving and a passing beam (low beam) for use when passing an oncoming vehicle.

In order to prevent glare that dazzles an oncoming driver, a cutoff line is formed in a predetermined range at the upper edge of a light distribution pattern for the passing beam, such that light is substantially not radiated above the cutoff line.

In such a headlight, it is known that a desired light distribution pattern is formed through collaborative use of a plurality of light sources or optical systems.

For instance, Japanese Unexamined Patent Application Publication (JP-A) No. 2011-3515 describes that a main light distribution pattern or the like having a cutoff line is formed by a projector unit and a diffused light distribution pattern is formed by a reflector unit.

Japanese JP-A No. 2011-161035 describes that apart of abeam emitted by a light source of a projector unit is guided to a reflector by a mirror member to illuminate a shoulder or the like on the driving lane side.

JP-A No. 2001-195910 describes that an auxiliary light distribution pattern for a passing beam from a projector unit is formed by an auxiliary reflector.

In order to prevent glare that dazzles an oncoming driver or the like, it is required that a cutoff line be provided in a predetermined range in the horizontal direction for a passing beam (so-called low beam) of a vehicle headlight. Within a predetermined angle range ahead of the vehicle in the horizontal direction, light distribution above the cutoff line is restricted.

However, with such a passing beam, there are cases where the visibility of a pedestrian or the like beside a driving lane ahead of the vehicle is lower than with a driving beam (so-called high beam), rendering early detection of the pedestrian or the like difficult.

SUMMARY OF THE INVENTION

The present invention has been designed in consideration of the circumstances described above, and an object thereof is to provide a vehicle headlight with which early detection of a pedestrian or the like ahead of a vehicle is possible even with a passing beam having a cutoff line.

A first aspect of the present invention provides a vehicle headlight including: a first illuminator that has a projector unit including a projection optical system and illuminates a predetermined region ahead of a vehicle with a first light distribution pattern having a cutoff line at an upper end; and a second illuminator that has a reflector unit including a reflective optical system and illuminates, with a second light distribution pattern that partially overlaps with the first light distribution pattern, a region extended further toward an upper side than the first light distribution pattern in a range outside a predetermined horizontal angle from an elbow point of the cutoff line.

The second light distribution pattern of the second illuminator may include a region that extends outside in a vehicle width direction relative to a region extended further toward the upper side than the first light distribution pattern and that is on a lower side of the cutoff line of the first light distribution pattern.

DETAILED DESCRIPTION

The present invention achieves the object of providing a headlight with which early detection of a pedestrian or the like ahead of a vehicle is possible even with a passing beam having a cutoff line by forming a main light distribution pattern having a cutoff line with a projector unit and radiating light, with a diffused light distribution pattern of a reflector unit, above the cutoff line in a range away from the elbow point by a predetermined angle or greater in the horizontal direction.

An example of a vehicle headlight to which the present invention is applied will be described below.

The vehicle headlight (hereinafter referred to simply as "headlight") in the example is provided to the front end of a body of a vehicle such as a passenger car.

Figure 1:
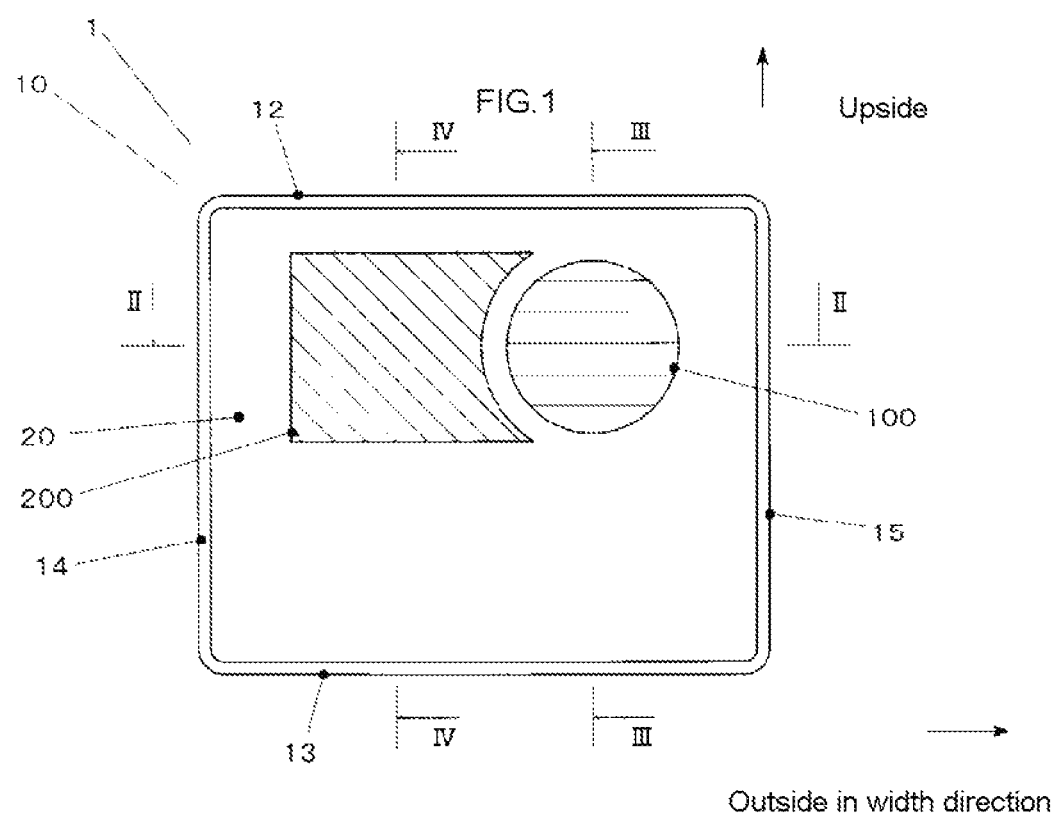
FIG. 1 is a view of a vehicle headlight according to an example of the present invention when seen from the front.

FIG. 1 is a view of the headlight in the example when seen from the front.

Figure 2:
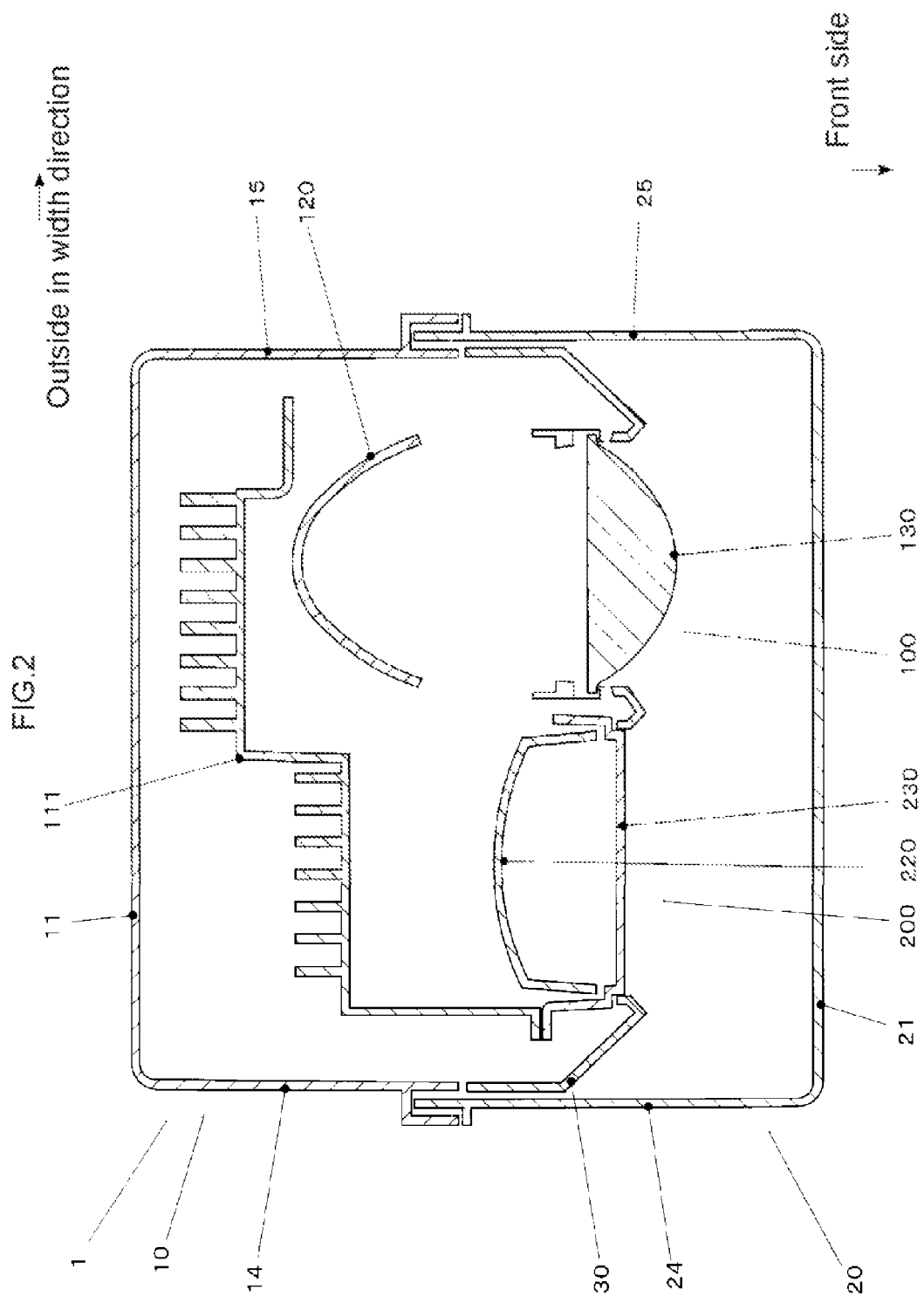
FIG. 2 is a sectional view along line II-II in FIG. 1.
Figure 3:
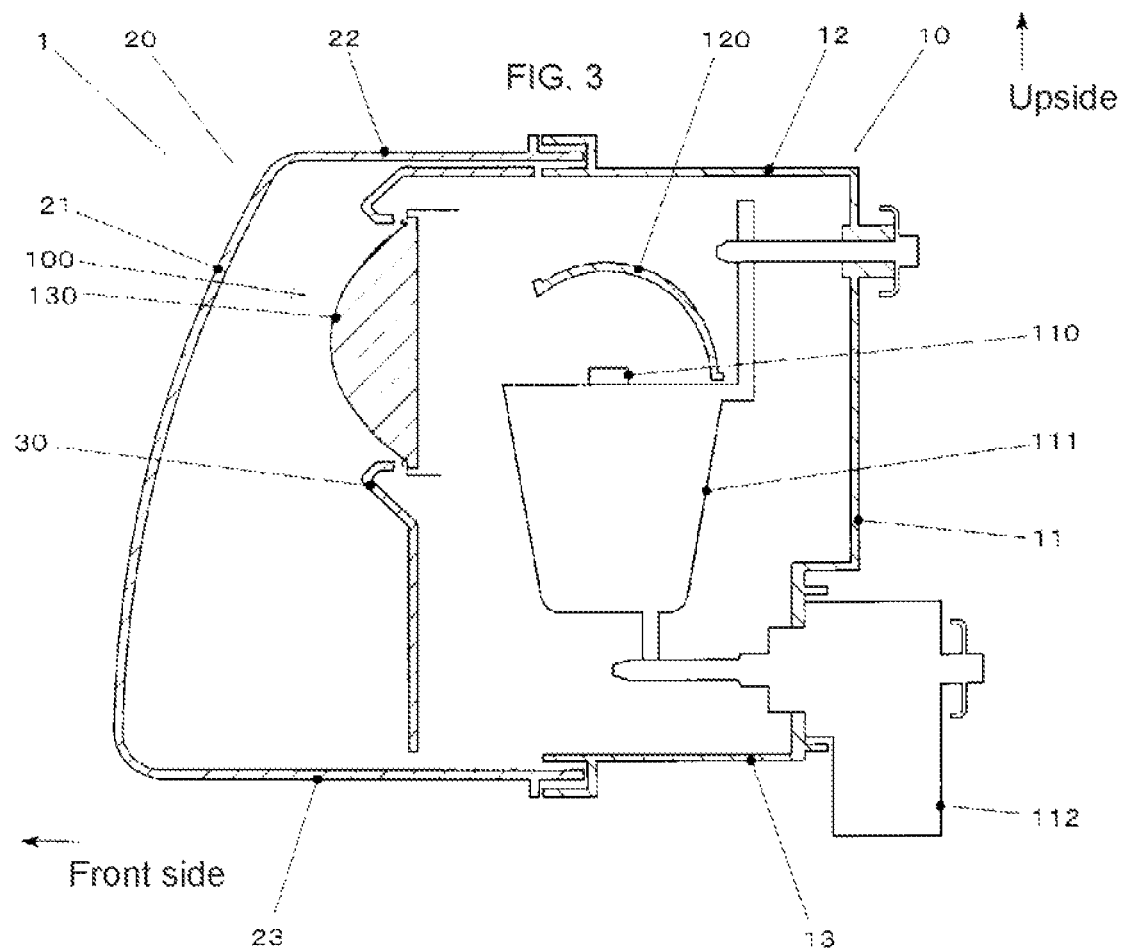
FIG. 3 is a sectional view along line III-III in FIG. 1.
Figure 4:
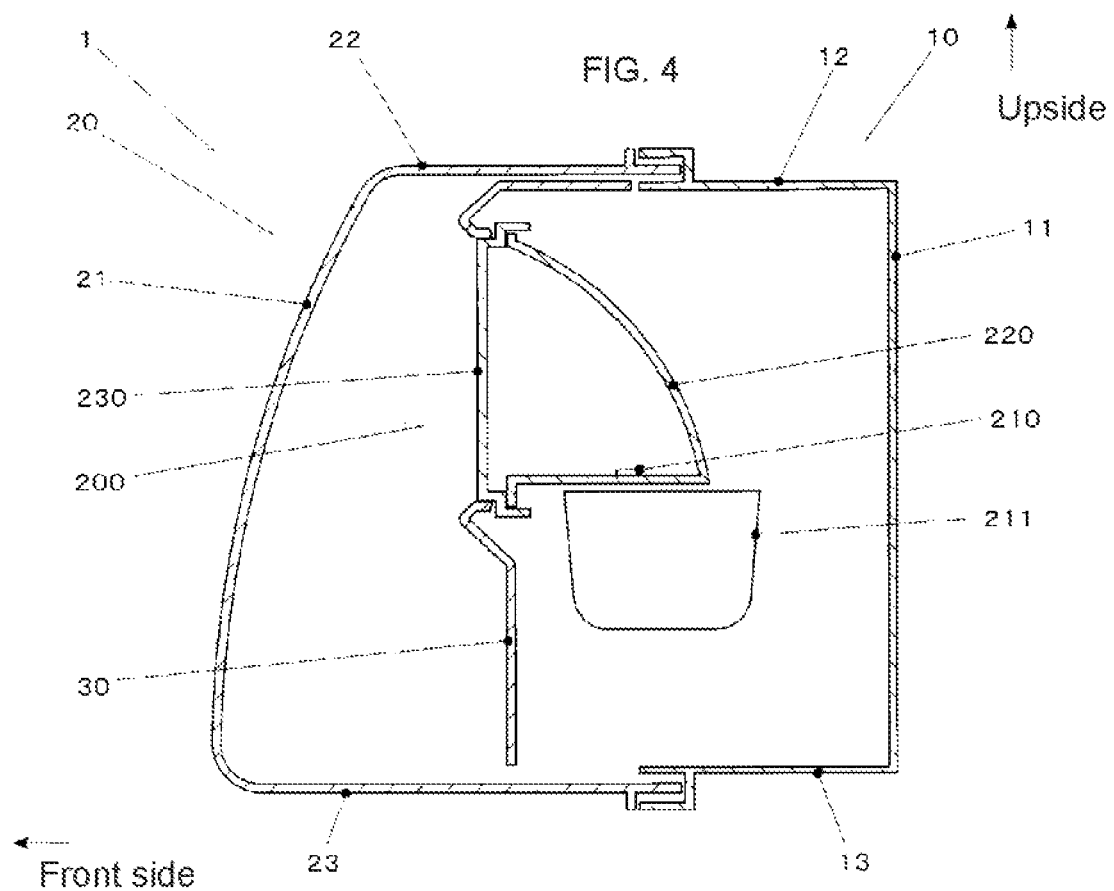
FIG. 4 is a sectional view along line IV-IV in FIG. 1.
Figure 5:
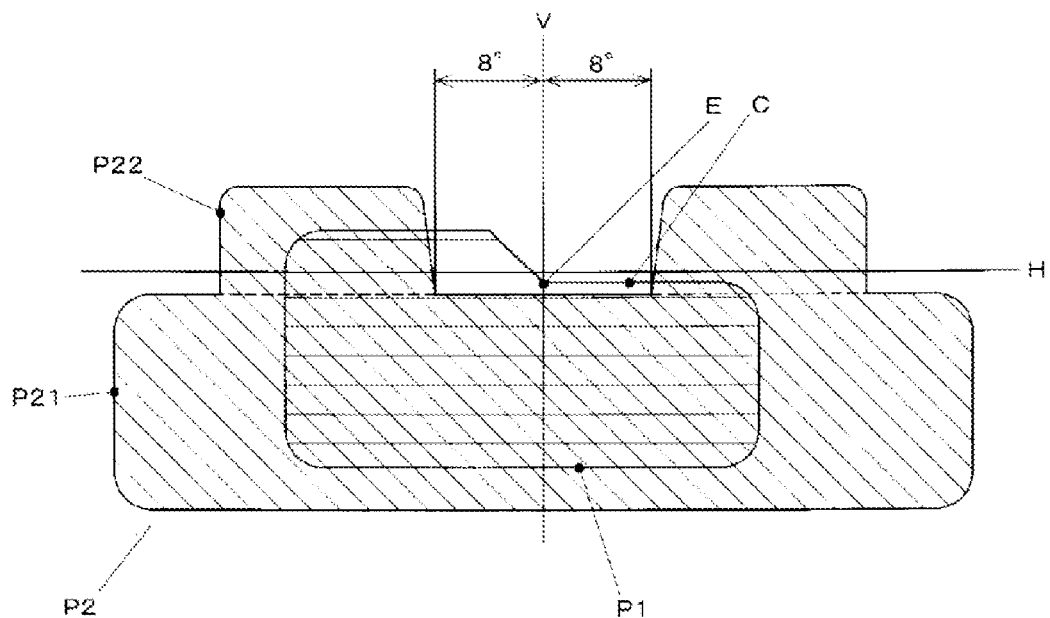
FIG. 5 is a diagram illustrating the light distribution pattern of the vehicle headlight in the example.

FIG. 2 is a sectional view along line II-II in FIG. 1.
FIG. 3 is a sectional view along line III-III in FIG. 1.
FIG. 4 is a sectional view along line IV-IV in FIG. 1.
FIG. 5 is a sectional view along line V-V in FIG. 1.

Headlights 1 are provided in a pair to the front end of the body with an interval in the width direction.

The headlight 1 includes a housing 10, an outer lens 20, a bezel extension 30, a first unit 100, a second unit 200, and the like.

The housing 10 is a case housing the respective units 100 and 200.

The housing 10 is formed in a box shape having an opening on the front side through injection molding with a resin material, for instance.

The housing 10 includes a back surface 11, an upper surface 12, a lower surface 13, side surfaces 14 and 15, and the like.

The back surface 11 is a surface on the rear side of the housing 10 and is formed in a flat shape extending approximately along the width direction and the vertical direction.

The shape of the back surface 11 when seen from the front is substantially a wide rectangle.

The upper surface 12, the lower surface 13, the side surfaces 14 and 15 have a flat shape and protrude to the front side respectively from the upper end, the lower end, and the side ends of the back surface 11.

The outer lens 20 closes the opening on the front side of the housing 10 and covers the front surface of the respective units 100 and 200.

The outer lens 20 is formed integrally of a transparent resin material.

The outer lens 20 includes a front surface 21, an upper surface 22, a lower surface 23, side surfaces 24 and 25, and the like.

The front surface 21 is a design surface exposed on the outside in a convex shape that protrudes to the front side with an inclination such that the upper end is receded further toward the rear side than the lower end.

The upper surface 22, the lower surface 23, the side surfaces 24 and 25 have a flat shape and protrude to the rear side respectively from the upper end, the lower end, and the side ends of the front surface 21.

The rear edges of the upper surface 22, the lower surface 23, and the side surfaces 24 and 25 are inserted to an engagement groove formed at the front edge of the upper surface 12, the lower surface 13, and the side surfaces 14 and 15 of the housing 10.

The bezel extension 30 is a design component on the inside (rear side) of the outer lens 20 and is provided with an opening in which lenses for respective units 100 and 200 or the like are disposed.

The first unit 100 is an illuminator (projector unit) that projects light emitted by an LED light source 110 to a predetermined region on the front side with a reflector 120 and a projection optical system 130.

The LED light source 110 is, for instance, a white LED and includes a heat sink 111, an optical-axis adjustment actuator 112, and the like.

The heat sink 111 releases heat generated by the LED light source 110 from a radiation fin protruding to the rear side and also acts as a base on which the LED light source 110 is installed.

As shown in FIG. 2, a part of the heat sink 111 extends to the rear of the second unit 200.

The LED light source 110 is placed on the upper surface of the heat sink 111.

The upper end of the heat sink 111 is swingably attached to the back surface 11 of the housing 10.

The lower end of the heat sink 111 is attached to the back surface 11 through the optical-axis adjustment actuator 112.

The optical-axis adjustment actuator 112 tilts the optical axis of the first unit 100 in the vertical direction by causing displacement of the lower end of the heat sink 111 in the front-back direction.

The reflector 120 is a parabolic reflector that covers from above the LED light source 110 installed on the upper surface of the heat sink 111.

With the reflector 120, light from the LED light source 110 is collected and reflected to the front side into the projection optical system 130.

The projection optical system 130 is provided with a shade having a shape corresponding to a cutoff line. By projecting an enlarged image of the shade to the front side, a cutoff line in a light distribution pattern P1 (see FIG. 5) is formed.

As shown in FIG. 1, the shape of the projection optical system 130 when seen from the front is substantially a circle.

The second unit 200 is an illuminator (reflector unit) that radiates light emitted by an LED light source 210 to a predetermined region ahead of the vehicle with a reflector 220.

The second unit 200 is disposed beside the first unit 100 to be on the inside in the width direction.

The LED light source 210 is, for instance, a white LED and includes a heat sink 211.

The heat sink 211 releases heat generated by the LED light source 210 from a radiation fin and also acts as a base on which the LED light source 210 is installed.

The LED light source 210 is placed on the upper surface of the heat sink 211.

The reflector 220 is a parabolic reflector that covers from above the LED light source 210 installed on the upper surface of the heat sink 211.

The reflector 220 reflects light from the LED light source 210 and projects light to the front via an inner lens 230 in a predetermined light distribution pattern P2 (see FIG. 5).

The inner lens 230 is disposed within an opening of the bezel extension 30 on the front side of the reflector 220.

The inner lens 230 is formed substantially of a flat transparent plate.

As shown in FIG. 1, the shape of the inner lens 230 when seen from the front is substantially a rectangle with a cutout along an arc concentric with the first unit 100 in a portion beside the first unit 100.

Next, the light distribution pattern formed by the headlight 1 will be described.

FIG. 5 is a view illustrating the light distribution patterns of the headlight 1. The V-axis and the H-axis respectively represent a vertical line and a horizontal line.

FIG. 5 illustrates a state of a passing beam (low beam) where light is projected on a flat surface disposed along the vertical direction and the width direction to face the vehicle from the front side.

FIG. 5 illustrates a case of left-hand traffic as one example and is mirror-reversed in the case of right-hand traffic.

The first unit 100 and the second unit 200 respectively form the light distribution patterns P1 and P2.

The light distribution pattern P1 is formed substantially in a rectangular shape having alongside along the width direction and includes a cutoff line C at the upper end.

The light distribution pattern P1 is intended to ensure long-distance visibility along the center on a driving lane of the vehicle, and is a main light distribution pattern that meets the standards for light distribution based on regulations in, for instance, Japan, Europe, China, and the US.

In the middle (along the traveling direction of the vehicle) of a cutoff line C in the left-right direction, an elbow point E at which there is an upward fold from the horizontal is provided.

On the oncoming lane side (right side in the case of left-hand traffic and left side in the case of right-hand traffic) of the elbow point E, the cutoff line C is along the horizontal direction and in a position lower than a horizontal plane passing through the center of the headlight 1, so that light above the cutoff line C is substantially blocked.

On the non-oncoming lane side (left side in the case of left-hand traffic and right side in the case of right-hand traffic) of the elbow point E, the upper end of the light distribution pattern P1 is in a step shape and higher than on the oncoming lane side. In a region adjacent to the elbow point E, the cutoff line is inclined such that the non-oncoming lane side is higher.

In a region on the non-oncoming lane side of the elbow point E, the upper end of the light distribution pattern P1 is above the horizontal plane passing through the center of the headlight 1.

The light distribution pattern P2 includes upper portions P22 that extend upward respectively from the vicinity of left and right side portions of a lower portion P21 formed substantially in a rectangular shape having a long side along the width direction.

On the oncoming lane side of the elbow point E of the light distribution pattern P1, the upper end of the lower portion P21 is lower than the cutoff line C.

The lower end of the lower portion P21 is at a height lower than the lower end of the light distribution pattern P1 and extends horizontally.

The left and right end portions of the lower portion P21 extend beyond the left and right ends of the light distribution pattern P1.

The middle portion of the lower portion P21 in the width direction overlaps with the light distribution pattern P1.

The upper portion P22 is substantially a rectangular region that extends upward from the upper end of the lower portion P21.

The upper portion P22 can illuminate a pedestrian or the like present on a shoulder about 30 m ahead, for instance.

The upper end of the upper portion P22 is higher than the upper end of the light distribution pattern P1.

For compliance with regulations or the like, the upper portion P22 is caused to not fall under a predetermined angle range (e.g.,) 8° in respective width directions with respect to the elbow point E of the light distribution pattern P1.

The side end of the upper portion P22 on the opposite side of the elbow point E is offset toward the elbow point E with respect to the side end of the lower portion P21. That is, the side end portions of the lower portion P21 extend to the left and right relative to the upper portion P22.

With the example described above, the following effects can be obtained.

(1) By being illuminated with the second unit 200 having the light distribution pattern P2 that extends further upward than the light distribution pattern P1 of the first unit 100, a target such as a pedestrian, bicycle, or stopped vehicle present beside a driving lane ahead of the vehicle can be detected at an early point.

Also, by limiting the range (upper portion P22) in which the light distribution pattern P2 extends further upward than the light distribution pattern P1 of the first unit 100 to a range outside at least a predetermined horizontal angle from the elbow point E of the cutoff line C, compliance with, for example, regulations and laws becomes possible.

Further, by forming the light distribution pattern P2 of the second unit 200 as a diffused light distribution pattern with the reflector unit, light can be radiated in a wide range naturally without a conspicuous contrast along the outline of the light distribution pattern P2 or the like.

(2) By extending the second light distribution pattern P2 of the second unit 200 to the left and right near the vehicle, the visibility of a pedestrian, obstacle, or the like on the left and right near the vehicle can be improved without increasing the number of parts forming the headlight 1.

(Modified Example)

The present invention is not limited to the example described above. Various modifications and changes are possible and within the technical scope of the present invention.

(1) The shape, structure, material, manufacturing method, and the like of each component forming the headlight are not limited to the configuration of the example described above, and may be changed appropriately.

(2) In the example, the respective units each include an independent light source. However, light emitted from a single light source may be used by a plurality of units. For instance, a common light source may be used by the first unit 100 and the second unit 200.

The type of a light source is also not particularly limited.

The invention claimed is:

1. A vehicle headlight comprising:
    a first illuminator including a projector unit that has a projection optical system and illuminates a predetermined region ahead of a vehicle with a first light distribution pattern having a cutoff line at an upper end; and
    a second illuminator that has a reflector unit including a reflective optical system and illuminates, with a second light distribution pattern that partially overlaps with the first light distribution pattern, a region extended further toward an upper side than the first light distribution pattern in a range outside a predetermined horizontal angle from an elbow point of the cutoff line,
    wherein the second light distribution pattern of the second illuminator includes a region that extends outside in a vehicle width direction relative to a region extended further towards the upper side than the first light distribution pattern, and that is on a lower side of the cutoff line of the first light distribution pattern.

* * * * *